United States Patent
Zhang

(10) Patent No.: US 9,547,087 B1
(45) Date of Patent: *Jan. 17, 2017

(54) SYNC FEEDBACK FOR TIME TO FIRST FIX

(71) Applicant: Marvell International Ltd., Hamilton (BM)

(72) Inventor: Wentao Zhang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 365 days.

This patent is subject to a terminal disclaimer.

(21) Appl. No.: 14/176,415

(22) Filed: Feb. 10, 2014

Related U.S. Application Data

(63) Continuation of application No. 13/942,659, filed on Jul. 15, 2013, now Pat. No. 8,665,150, which is a continuation of application No. 13/052,694, filed on Mar. 21, 2011, now Pat. No. 8,487,811.

(60) Provisional application No. 61/326,122, filed on Apr. 20, 2010.

(51) Int. Cl.
  *G01S 19/42* (2010.01)
  *G01S 19/24* (2010.01)

(52) U.S. Cl.
  CPC ............... *G01S 19/42* (2013.01); *G01S 19/24* (2013.01)

(58) Field of Classification Search
  CPC ........... G01S 19/24; G01S 19/42; G01S 19/35
  USPC ........................................ 342/357.25, 357.75
  See application file for complete search history.

(56) References Cited

U.S. PATENT DOCUMENTS

| | | |
|---|---|---|
| 6,466,164 B1 | 10/2002 | Akopian et al. |
| 7,064,709 B1 | 6/2006 | Weisenburger et al. |
| 8,487,811 B1 | 7/2013 | Zhang |
| 8,665,150 B1 | 3/2014 | Zhang |
| 2011/0007783 A1 | 1/2011 | Weill |
| 2011/0050495 A1 | 3/2011 | Huang et al. |

OTHER PUBLICATIONS

"Corrected Notice of Allowance", U.S. Appl. No. 13/942,659, Jan. 14, 2014, 2 pages.
"Non-Final Office Action", U.S. Appl. No. 13/052,694, Dec. 13, 2012, 6 pages.
"Notice of Allowance", U.S. Appl. No. 13/052,694, Mar. 13, 2013, 5 pages.
"Notice of Allowance", U.S. Appl. No. 13/942,659, Oct. 17, 2013, 6 pages.

*Primary Examiner* — Harry Liu

(57) ABSTRACT

In embodiments of sync feedback for time to first fix (TTFF), satellite data signals are received from which a geographic position of a positioning-system device can be determined. The satellite data signals each include a time reference and ephemeris data that indicates an orbital position of a satellite. A sync feedback is generated that includes a time-free position fix determined from a satellite data signal before bit sync and/or frame sync of the satellite data signal are obtained. The sync feedback is then utilized as a feedback input to determine the bit sync and/or the frame sync of the satellite data signal.

20 Claims, 5 Drawing Sheets

SYNC FEEDBACK FOR TIME TO FIRST FIX

RELATED APPLICATION

This application is a continuation of and claims priority to U.S. Utility patent application Ser. No. 13/942,659, filed on Jul. 15, 2013 which is a continuation of and claims priority to U.S. Utility patent application Ser. No. 13/052,694, filed on Mar. 21, 2011, now U.S. Pat. No. 8,487,811, which in turn claims priority to U.S. Provisional Patent Application Ser. No. 61/326,122 filed Apr. 20, 2010, the disclosure of which are incorporated by reference herein in their entirety.

BACKGROUND

The Background described in this section is included merely to present a general context of the disclosure. The Background description is not prior art to the claims in this application, and is not admitted to be prior art by inclusion in this section.

The Global Positioning System (GPS) is a global navigation satellite system (GNSS) that includes devices implemented to receive satellite data signals. For example, hand-held navigation devices, vehicle navigation devices, as well as navigation-enabled devices, such as mobile phones and computer devices, are increasingly more common. The satellite data signals are transmitted from satellites of the GNSS, and the satellite data signals include an accurate satellite time reference generated by an atomic clock on each satellite, ephemeris data that includes orbital information for a satellite, and the almanac information that includes approximate orbital and status information for all of the satellites in the system.

A time to first fix (TTFF) is a measure of the time duration, or time lapse, for a GPS receiver to acquire satellite data signals and calculate a position solution, referred to as a position fix of the receiver. Generally, a fast time to a first position fix is a desired parameter or characteristic of GPS-enabled devices when the position of a device is determined and calculated from the satellite data signals. A GPS receiver can take time to acquire each GPS satellite data signal, and the time lapse may range from thirty seconds to several minutes for satellite signal acquisition and tracking to then calculate a solution for the receiver position fix.

To calculate a solution for a position fix, a GPS receiver uses the satellite data signals to determine a precise time of signal transmission from each satellite, and then computes a distance to each satellite. The time difference between satellite signal reception and transmission provides the receiver with information to determine the range to a transmitting satellite. Based on the computed distances and the position of each satellite in orbit, a GPS receiver can determine the geographic position of the receiver and display the determined position for a user, such as on a hand-held navigation device or in a vehicle. Typically, the satellite data signals from three satellites are used to determine position along with the satellite data signal from a fourth satellite that is used to determine a correction for time error.

A common and significant source of the time error is the clock in a GPS receiver. Because the speed of light is such a large value when determining the precise time of signal transmission from each satellite, even a one microsecond clock error of the GPS receiver clock can result in a position determination error of almost a thousand feet. Ideally, a GPS receiver implemented with an atomic clock would keep precise time for position determination. However, the expense of an atomic clock would likely double the cost of GPS-enabled devices.

Rather than using atomic clocks in GPS-enabled receiving devices, the distance to each satellite is based on a pseudo-range, which is an approximation of the distance between a satellite and the GPS receiver, because the calculated distances to the three satellites are all based on the same approximate clock error. The distances, or ranges, with the same approximate clock error are the pseudo-ranges. The time error can then be estimated from the determined pseudo-ranges and an additional fourth satellite. The geographic position of a GPS receiver can be accurately computed from the position of the receiver along the x, y, and z axes (e.g., latitude, longitude, and altitude) with a time error $\Delta t$ based on the pseudo-ranges and orbit positions of the four or more satellites.

SUMMARY

This Summary introduces concepts of sync feedback for time to first fix (TTFF), and the concepts are further described below in the Detailed Description and/or shown in the Figures. Accordingly, this Summary should not be considered to describe essential features nor used to limit the scope of the claimed subject matter.

In one aspect, the present disclosure describes a positioning-system device that includes a receiver to acquire and pull-in satellite data signals from which a geographic position of the positioning-system device can be determined. Each of the satellite data signals includes a time reference and ephemeris data that indicates an orbital position of a satellite. The positioning-system device also includes a position solution service that is implemented to generate sync feedback that includes a time-free position fix determined from a satellite data signal after signal pull-in, and before bit sync and/or frame sync are obtained. The position solution service is also implemented to utilize the sync feedback as a feedback input to determine the bit sync and/or the frame sync of the satellite data signal.

A method is implemented to receive satellite data signals that each includes a time reference and ephemeris data that indicates an orbital position of a satellite. The method is further implemented to generate sync feedback that includes a time-free position fix determined from a satellite data signal before bit sync and/or frame sync are obtained. The method is further implemented to utilize the sync feedback as a feedback input to determine the bit sync and/or the frame sync of the satellite data signal.

A system-on-chip (SoC) includes a positioning-system receiver to receive satellite data signals. The SoC also includes a position solution service programmed to generate sync feedback that includes a time-free position fix determined before bit sync and/or frame sync are obtained for a satellite data signal. The position solution service is also programmed to utilize the sync feedback as a feedback input to determine the bit sync and/or the frame sync of the satellite data signal.

BRIEF DESCRIPTION OF THE DRAWINGS

Embodiments of sync feedback for time to first fix (TTFF) are described with reference to the following Figures. The same numbers may be used throughout to reference like features and components that are shown in the Figures.

DETAILED DESCRIPTION

Figure 1:
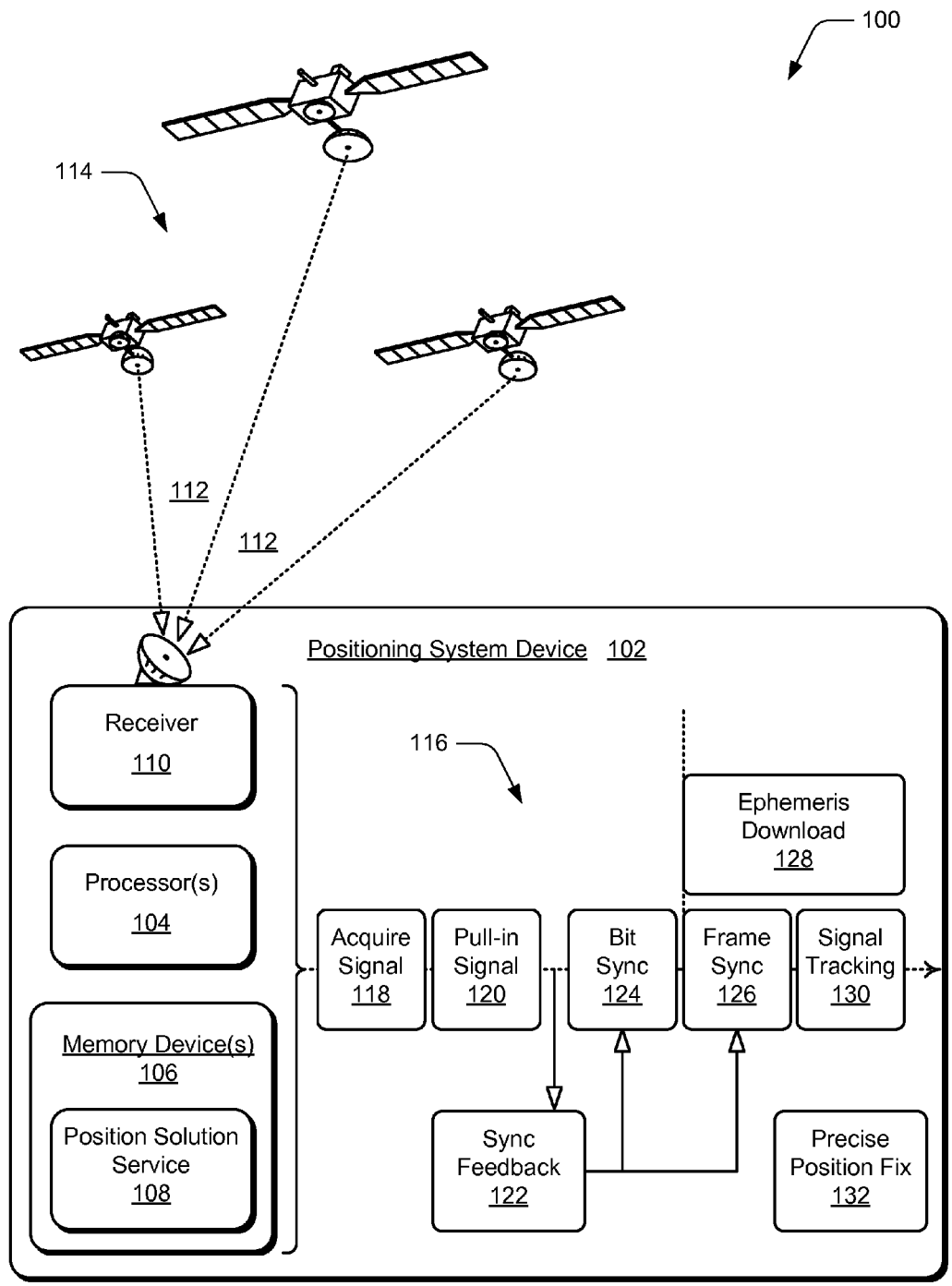
FIG. 1 illustrates an example positioning system in which embodiments of sync feedback for TTFF can be implemented.

Embodiments of sync feedback for time to first fix (TTFF) provide techniques for a fast time to first fix, such as in a Global Positioning System (GPS)-enabled device. A traditional position fix is determined by a conventional GPS device based on an accurate time determination, which may be approximately +/−ten milliseconds (10 ms) after frame sync of a satellite data signal is obtained. However, there may be a significant time delay before the GPS device can determine the accurate time, and then determine the position fix of the device. When the elements for satellite data signal processing are processed serially in a conventional GPS device, there are time delays for signal acquisition, signal pull-in, and then bit sync and frame sync of the satellite data signal. Only after frame sync is obtained, and the ephemeris data downloaded, is the accurate time available for use in a conventional GPS device to then determine an accurate position fix.

Rather than delay determination of a position fix until after frame sync, embodiments of sync feedback for TTFF are implemented to determine a time-free position fix from received satellite data signals after signal acquisition and signal pull-in, but before bit sync and/or frame sync of a satellite data signal are obtained. Time-free positioning refers to a position fix determination before bit sync and/or frame sync. Conventional techniques may include initial time errors of tens of seconds, such as sixty seconds (60 sec). The synch feedback from time-free positioning can be utilized to obtain bit sync and/or frame sync directly, or significantly decrease the time that it takes to obtain the bit sync and/or frame sync. For example, the time of uncertainty can be reduced from tens of seconds down to tens of milliseconds, and then by utilizing an additional bit-matching technique, the frame sync may be obtained without delay.

In embodiments of sync feedback for TTFF, sync feedback is generated to include the time-free position fix, and the sync feedback is utilized as a feedback input to determine the bit sync and/or the frame sync of a satellite data signal. By utilizing the sync feedback from time-free positioning, the TTFF is determined faster than with conventional techniques. Typically, time-free positioning is used for the determination of the first few position fixes, and then position determinations are based on traditional positioning techniques. However, even after one or more position fixes are determined with time-free positioning, the transition to traditional positioning techniques may still be delayed while bit sync and/or frame sync is obtained. Sync feedback for TTFF significantly decreases, or may even eliminate, the delay to transition from time-free positioning to a traditional positioning technique.

The sync feedback also includes a precise time of reception (ToR) for each of the received satellite data signals, and also includes a precise time of transmission (ToT) for each of the received satellite data signals. The precise time of reception (ToR) is determined based on the time-free position fix, and the precise time of reception (ToR) is included in the sync feedback. The precise time of transmission (ToT) is then determined based on the precise time of reception (ToR), and the precise time of transmission (ToT) is also included in the sync feedback.

With sync feedback, the frame sync can be determined approximately simultaneously with the bit sync, which contributes to a more robust fast TTFF determination. Download of the ephemeris data for a satellite data signal can also be initiated sooner than would be in a conventional GPS device. Additionally, having already determined the precise time of reception (ToR) and the precise time of transmission (ToT) for the satellite data signals, a precise position fix based on accurate time can be determined quickly, which also contributes to a fast and accurate TTFF determination. Further, if a Kalman filter is applied to smooth position fix determinations, the filtering can be initiated sooner than would be in a conventional GPS device.

While features and concepts of sync feedback for TTFF can be implemented in any number of different devices, systems, environments, networks, and/or configurations, embodiments of sync feedback for TTFF are described in the context of the following example devices, systems, and methods.

FIG. 1 illustrates an example positioning system 100 in which embodiments of sync feedback for time to first fix (TTFF) can be implemented. Example positioning system 100 includes a positioning-system device 102, which may be any type of device that includes features for navigation and/or positioning for use in a global navigation satellite system (GNSS), such as the Global Positioning System (GPS). The positioning-system device 102 can be any one or combination of a fixed or mobile device, in any form of a hand-held and/or vehicle navigation device, portable computer, mobile phone, communication device, media player, consumer electronic device, and the like.

The positioning-system device 102 includes various components to enable the device for GPS or similar global navigation, such as one or more processors 104 (e.g., any of microprocessors, controllers, and the like) and memory devices 106. The positioning-system device 102 can also be implemented with any number and combination of differing components as further described with reference to the example device shown in FIG. 6. The processors and memory implement a position solution service 108 that can be implemented as computer-executable instructions, such as a software application, that is executable to implement the various embodiments of sync feedback for TTFF described herein.

The positioning-system device 102 also includes a receiver 110, such as a GPS receiver, or other type of positioning-system receiver, that is implemented to receive satellite data signals 112 from satellites 114 of the example positioning system. Although shown as independent components, the receiver 110 may be implemented to include the processors 104, memory devices 106, and position solution service 108. Alternatively or in addition, the components may all be implemented as a system-on-chip (SoC) in a positioning-system device, such as described with reference to the example SoC shown in FIG. 3.

In GPS, each of the satellite data signals 112 includes a time reference for transmission of a data signal, ephemeris data that indicates an orbital position of a satellite from which the data signal is transmitted, and the almanac information that includes approximate orbital and status information for all of the satellites in the system. A representation of satellite data signal processing 116 is also shown and described with reference to the positioning-system device 102. The receiver 110 can acquire a satellite data signal at 118 and pull-in the signal at 120, which indicates an approximate location of the satellite data signal after the signal has been acquired.

In embodiments, the position solution service 108 is implemented to generate sync feedback 122 from the satellite data signals 112 after signal pull-in at 120, but before bit sync 124 and/or frame sync 126 are obtained. In embodiments, the position solution service is implemented to utilize the sync feedback as a feedback input to determine the bit sync and/or the frame sync. With the feedback input, the position solution service 108 can determine the frame sync approximately simultaneously with the bit sync.

An initial time error for conventional positioning techniques may typically be within one second (1 sec). After bit sync, the positioning becomes more certain for approximately the first twenty milliseconds (20 ms), but again becomes uncertain. After frame sync, the twenty millisecond (20 ms) uncertainties are resolved, and after traditional positioning, the time error is improved to tens of nanoseconds, such as approximately fifty nanoseconds (50 ns). With time-free positioning, the initial time error may typically be tens of seconds, such as approximately sixty seconds (60 sec). Sync feedback before bit sync improves the delay to obtain bit sync, and after bit sync but before frame sync, the sync feedback can resolve the approximately twenty millisecond (20 ms) uncertainties immediately.

Figure 2:
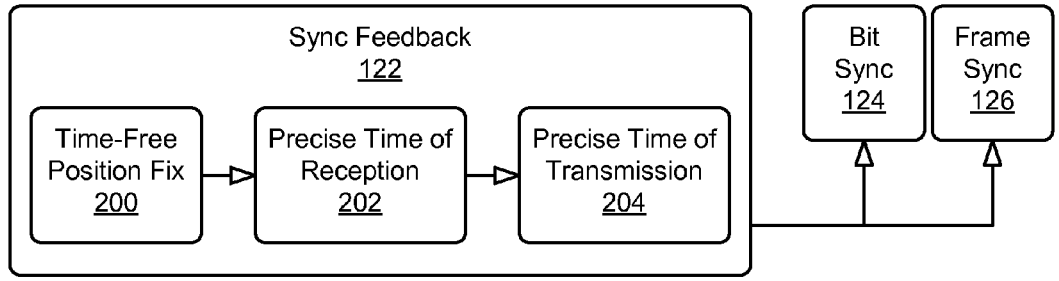
FIG. 2 illustrates sync feedback in accordance with one or more embodiments of sync feedback for TTFF.

FIG. 2 further illustrates the sync feedback 122 as the feedback input to determine the bit sync 124 and/or the frame sync 126. The sync feedback includes a determination of a time-free position fix 200, a determination of a precise time of reception (ToR) 202 of a satellite data signal at the receiver of the positioning-system device 102, and a determination of a precise time of transmission (ToT) 204 of the satellite data signal from a satellite.

A traditional position fix is determined by a conventional GPS device based on an accurate time determination. However, there may be a significant time delay before the GPS device can determine the accurate time, and then the position fix of the device. When the elements for satellite data signal processing are processed serially in a conventional GPS device, the time delay for each element in the process can add up to the significant time delay. For example, signal acquisition may take a few seconds, signal pull-in a few hundred milliseconds, and bit sync may take a few hundred milliseconds to several seconds. A frame sync can take six seconds or longer, and ephemeris data download may take anywhere from eighteen seconds to several minutes, or even longer. Only after frame sync is obtained and the ephemeris data downloaded is the accurate time available for use in the conventional GPS device to then determine an accurate position fix.

Rather than delay determination of a position fix until after frame sync, as in a conventional GPS device, the position solution service 108 at the positioning-system device 102 is implemented to determine the time-free position fix 200 that correlates to the approximate geographic position (e.g., latitude, longitude, and altitude) of the positioning-system device. The time-free position fix can be determined from the satellite data signals 112 after signal pull-in at 120, but before bit sync 124 and/or frame sync 126 are obtained.

The time-free position fix 200 can be determined based on a state vector for determining a time-free position fix without accurate GPS time: $x=[\Delta x\ \Delta y\ \Delta z\ \Delta t_{r2}\ \Delta t_{r1}]^T$ where $\Delta x/\Delta y/\Delta z$ are the coordinate error components for latitude, longitude, and altitude; $\Delta t_{r1}$ is the common time error for all of the satellite data signals utilized in the code phase measurements (e.g., four or five satellites); and $\Delta t_{r2}$ is the total time error between approximate receiver time and GPS satellite time, which may be approximately one minute (1 min) for time-free positioning.

The position solution service 108 is implemented to determine the precise time of reception (ToR) 202, represented in equations by the parameter $t_r$, for each of the satellite data signals 112 that are received from the satellites 114. The precise time of reception (ToR) is determined based on the time-free position fix, and the precise time of reception (ToR) is included in the sync feedback 122. The position solution service 108 is also implemented to then determine the precise time of transmission (ToT) 204, represented in equations by the parameter $\hat{t}_s$, for each of the satellite data signals 112. The precise time of transmission (ToT) is determined based on the precise time of reception (ToR), and the precise time of transmission (ToT) is also included in the sync feedback.

The position solution service 108 determines the precise time of reception (ToR) 202 represented by the equation: $\hat{t}_r=t_r+\Delta t_{r2}+\Delta t_{r1}$ where $\hat{t}_r$ is the precise time of reception (ToR) of a satellite data signal at the receiver 110, in unit of seconds; $t_r$ is an approximate time of the signal reception at the receiver, in unit of seconds; $\Delta t_{r2}$ is an estimated total time error between approximate receiver time and GPS satellite time; and $\Delta t_{r1}$ is the common time error for all of the satellite data signals utilized in the code phase measurements (e.g., four or five satellites). The position solution service can then determine the precise time of transmission (ToT) based on the precise time of reception (ToR) as described with reference to the method shown in FIG. 4.

The position solution service 108 utilizes the sync feedback 122 as the feedback input to determine the bit sync 124 and/or the frame sync 126. The bit sync 124 and/or the frame sync 126 can be derived from the precise time of transmission (ToT) 204, represented by the parameter $\hat{t}_s$ with reference to the received satellite data signals, and represented by the values:

$i\text{Page}=\text{ceil}(\text{mod}(\hat{t}_s,750)/30)\ 1\sim 25,\ \text{integer}$ $i\text{Subframe}=\text{ceil}(\text{mod}(\hat{t}_s,30)/6)\ 1\sim 5,\ \text{integer}$ $i\text{Word}=\text{ceil}(\text{mod}(\hat{t}_s,6)/0.6)\ 1\sim 10,\ \text{integer}$ where the frame sync is obtained as the iBit:

$i\text{Bit}=\text{ceil}(\text{mod}(\hat{t}_s,0.6)/0.02)\ 1\sim 30,\ \text{integer}$ $i\text{EpochNum}=\text{floor}(\text{mod}(\hat{t}_s,0.02)/0.001)\ 0\sim 19,\ \text{integer}$ where the bit sync is obtained as the iChip:

$i\text{Chip}=\text{floor}(\text{mod}(\hat{t}_s,0.001)*1023000)\ 0\sim 1022,\ \text{integer}$ $\text{ChipPhase}=\text{mod}(\hat{t}_s,0.001)*1023000-i\text{Chip}\ 0.0\sim 1.0,\ \text{float}$ $$\text{mod}(y,x)=y-\text{floor}\left(\frac{y}{x}\right)\cdot x$$

The representation of satellite data signal processing 116 shown with reference to the positioning-system device 102 in FIG. 1 includes the ephemeris data downloaded at 128 from a satellite data signal. The satellite data signal is then tracked at 130 after the bit sync 124 and/or the frame sync 126 are determined. The position solution service 108 also determines the precise position fix 132 that correlates to the geographic position of the positioning-system device. For a fast time to first fix (TTFF), the time-free position fix 200 can be determined once by the position solution service. Additionally, the position solution service 108 can determine the frame sync approximately simultaneously with the bit sync, which also contributes to a fast TTFF determination.

In some conventional GPS devices, an estimated position fix may be displayed for initial use before the precise position fix based on accurate GPS time is determined and displayed. The estimated position fix may also be displayed with a dilution of position (DoP) indication that indicates to a user of the conventional GPS device an approximation of the accuracy of the estimated position fix. Both the estimated position fix and the dilution of position indication may cause user confusion when attempting to determine a geographic position. In embodiments of sync feedback for TTFF described herein, the position solution service 108 is implemented for a fast TTFF and precise position fix determination. Accordingly, a dilution of position indication and the time-free position fix 200 are not displayed as a position fix prior to the determined precise position fix 132 being displayed to indicate the geographic position of the positioning-system device.

Figure 3:
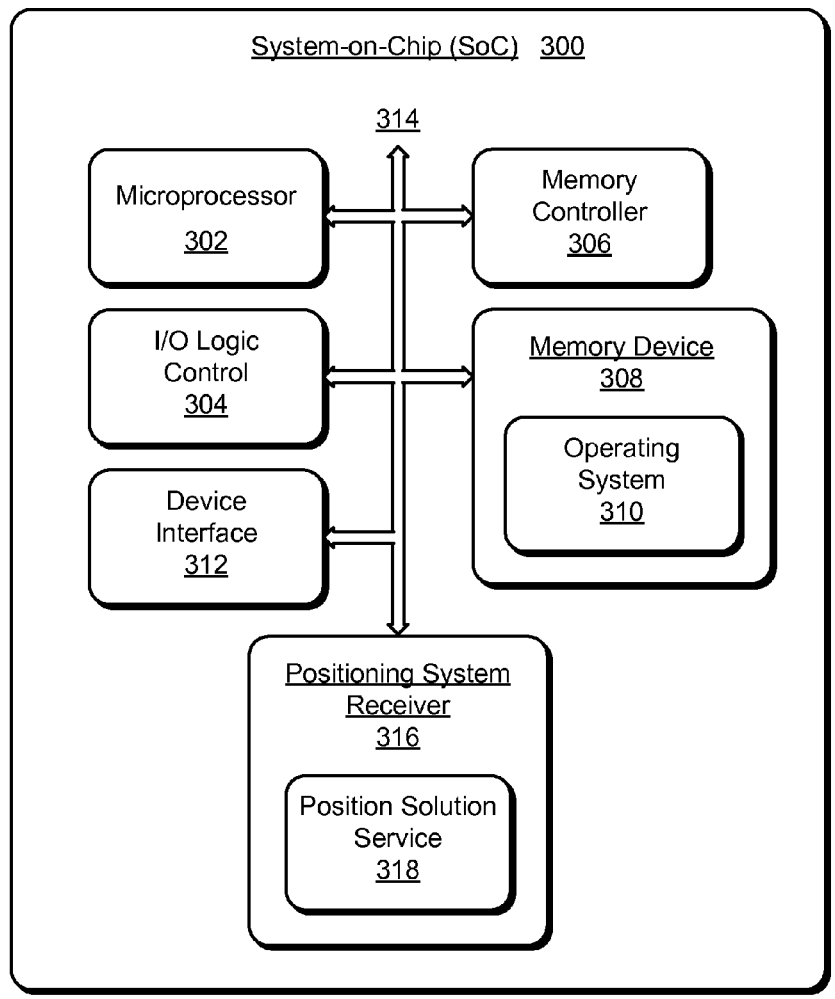
FIG. 3 illustrates an example system-on-chip (SoC) in which embodiments of sync feedback for TTFF can be implemented.

FIG. 3 illustrates an example system-on-chip (SoC) 300, which can implement various embodiments of sync feedback for time to first fix (TTFF) as described herein. The SoC may be implemented in a fixed or mobile device, such as any one or combination of a consumer, electronic, communication, navigation, media, and/or computing device, as well as in a vehicle that implements a navigation system. The SoC 300 can be integrated with electronic circuitry, a microprocessor, memory, input-output (I/O) logic control, communication interfaces and components, as well as other hardware, firmware, and/or software to implement a positioning-system device.

In this example, the SoC 300 is integrated with a microprocessor 302 (e.g., any of a microcontroller or digital signal processor) and input-output (I/O) logic control 304 (e.g., to include electronic circuitry). The SoC 300 also includes a memory controller 306 and a memory device 308, such as any type of a nonvolatile memory and/or other suitable electronic data storage device. The SoC can also include various firmware and/or software, such as an operating system 310 that is maintained by the memory and executed by the microprocessor.

The SoC 300 includes a device interface 312 to interface with a device or other peripheral component, such as when installed in any of the navigation, communication, and/or computer devices described herein. The SoC 300 also includes an integrated data bus 314 that couples the various components of the SoC for data communication between the components. The data bus in the SoC may also be implemented as any one or a combination of different bus structures and/or bus architectures.

In embodiments of sync feedback for TTFF, the SoC 300 includes a positioning-system receiver 316, such as a GPS receiver, or other type of positioning-system receiver, that receives satellite data signals from satellites of a positioning system. The positioning-system receiver also includes a position solution service 318 that can be implemented as computer-executable instructions maintained by the memory device 308 and executed by the microprocessor 302. Examples of the positioning-system receiver and the position solution service, as well as corresponding functionality and features, are described with reference to the respective components shown in FIGS. 1 and 2. Alternatively or in addition, components of the positioning-system receiver and position solution service can be implemented as hardware, firmware, fixed logic circuitry, or any combination thereof that is implemented in connection with the I/O logic control 304 and/or other processing and control circuits of the SoC.

Example methods 400 and 500 are described with reference to respective FIGS. 4 and 5 in accordance with one or more embodiments of sync feedback for time to first fix (TTFF). Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example method(s) may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 4:
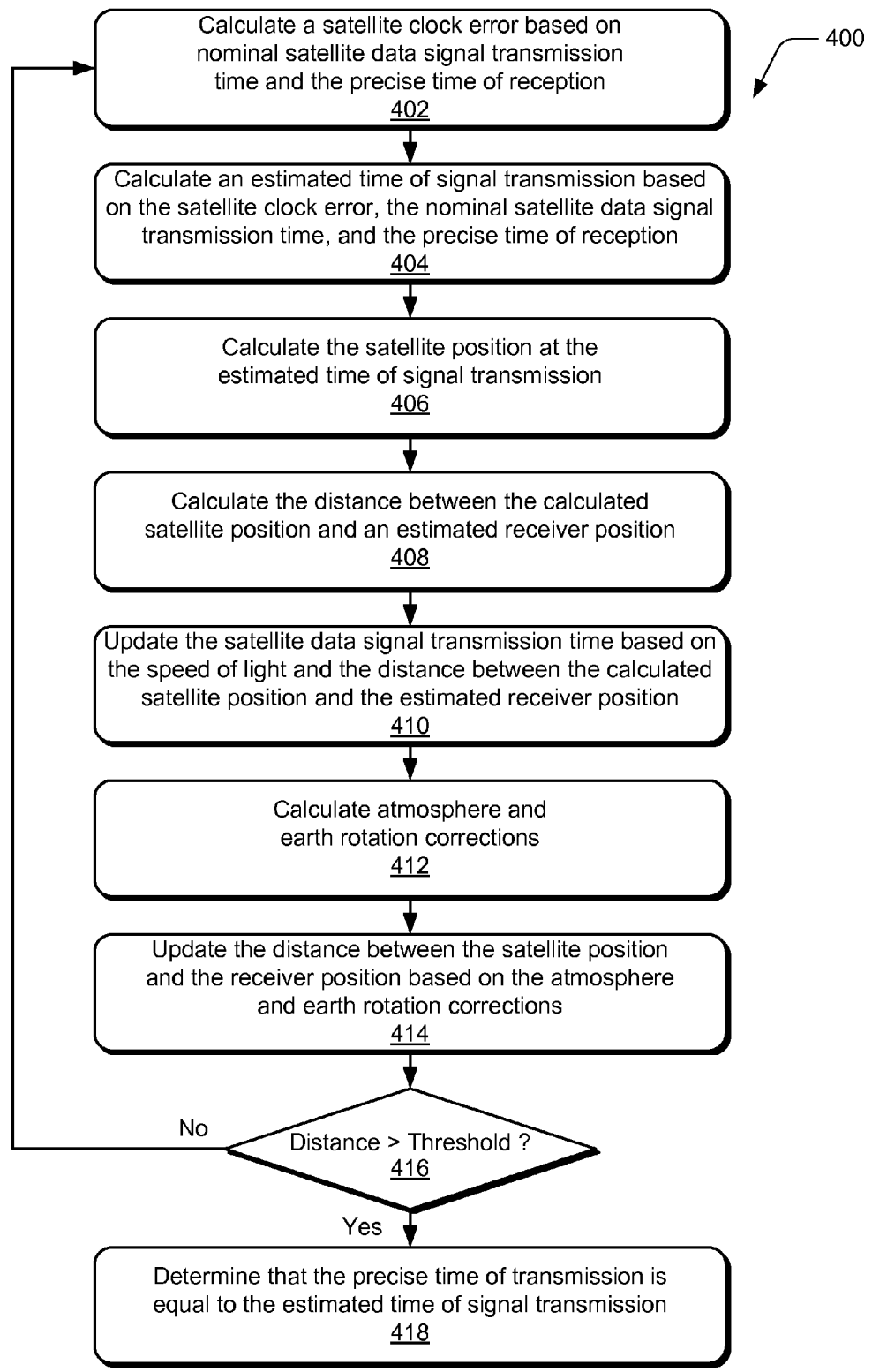
FIG. 4 illustrates example methods to determine a precise time of signal transmission (ToT) in accordance with one or more embodiments.

FIG. 4 illustrates example method(s) 400 of sync feedback for TTFF, and is described with reference to determining a precise time of signal transmission (ToT). The order in which the method is described is not intended to be construed as a limitation, and any number of the described method blocks can be combined in any order to implement the method, or an alternate method.

At block 402, a satellite clock error is calculated based on nominal satellite data signal transmission time from satellite to receiver, and the precise time of reception (ToR). For example, the position solution service 108 at positioning-system device 102 (FIG. 1) calculates the satellite clock error $\Delta t_{sclk}$ at $\hat{t}_r - \Delta t_{travel}$, where $\hat{t}_r$ is the precise time of reception (ToR) 202 (FIG. 2) and the nominal satellite data signal transmission time $\Delta t_{travel}$ is seventy-five milliseconds (0.075 s).

At block 404, an estimated time of signal transmission is calculated based on the satellite clock error, the nominal satellite data signal transmission time, and the precise time of reception (ToR). For example, the position solution service 108 calculates the estimated time of signal transmission, represented by the parameter $\hat{t}_s$, in the equation: $\hat{t}_s = \hat{t}_r - \Delta t_{travel} + \Delta t_{sclk}$, where $\hat{t}_r$ is the precise time of reception (ToR) 202, the nominal satellite data signal transmission time $\Delta t_{travel}$ is seventy-five milliseconds (0.075 s), and $\Delta t_{sclk}$ is the satellite clock error.

At block 406, the satellite position is calculated at the estimated time of signal transmission. For example, the position solution service 108 calculates the satellite position $r_s$ at the estimated time of signal transmission $\hat{t}_s$. At block 408, the distance between the calculated satellite position and an estimated receiver position is calculated. For example, the position solution service 108 calculates the distance ρ between the satellite position $r_s$ and the estimated receiver position $r_r$ in the equation: $\rho = \|r_s - r_r\|$.

At block 410, the satellite data signal transmission time is updated based on the speed of light and the distance between the satellite position and the estimated receiver position. For example, the position solution service 108 updates the satellite data signal transmission time $\Delta t_{travel}$ based on the speed of light and the distance ρ between the satellite position $r_s$ and the estimated receiver position $r_r$ in the equation: $\Delta t_{travel} = \rho/c$.

At block 412, atmosphere and earth rotation corrections are calculated. For example, the position solution service 108 calculates the atmosphere and earth rotation corrections $\Delta t_{corr}$. At block 414, the distance between the satellite position and the receiver position is updated based on the atmosphere and earth rotation corrections. For example, the position solution service 108 updates the distance Δρ between the satellite position and the receiver position based on the atmosphere and earth rotation corrections in the equation: $\Delta \rho = |[\hat{t}_r - (\tilde{t}_s - \Delta t_{sclk})] - (\Delta t_{travel} + \Delta t_{corr})| \cdot c$.

At block 416, a determination is made as to whether the updated distance between the satellite position and the receiver position is greater than a defined threshold. For example, the position solution service 108 compares the updated distance between the satellite position and the receiver position to a defined threshold. If the updated distance is greater than the threshold (i.e., "yes" from block 416), then at block 418, the precise time of transmission (ToT) $\hat{t}_s$ is determined to equal the estimated time of signal transmission $\tilde{t}_s$. If the updated distance is not greater than the threshold (i.e., "no" from block 416), then the method continues at block 402 to again calculate the satellite clock error.

Figure 5:
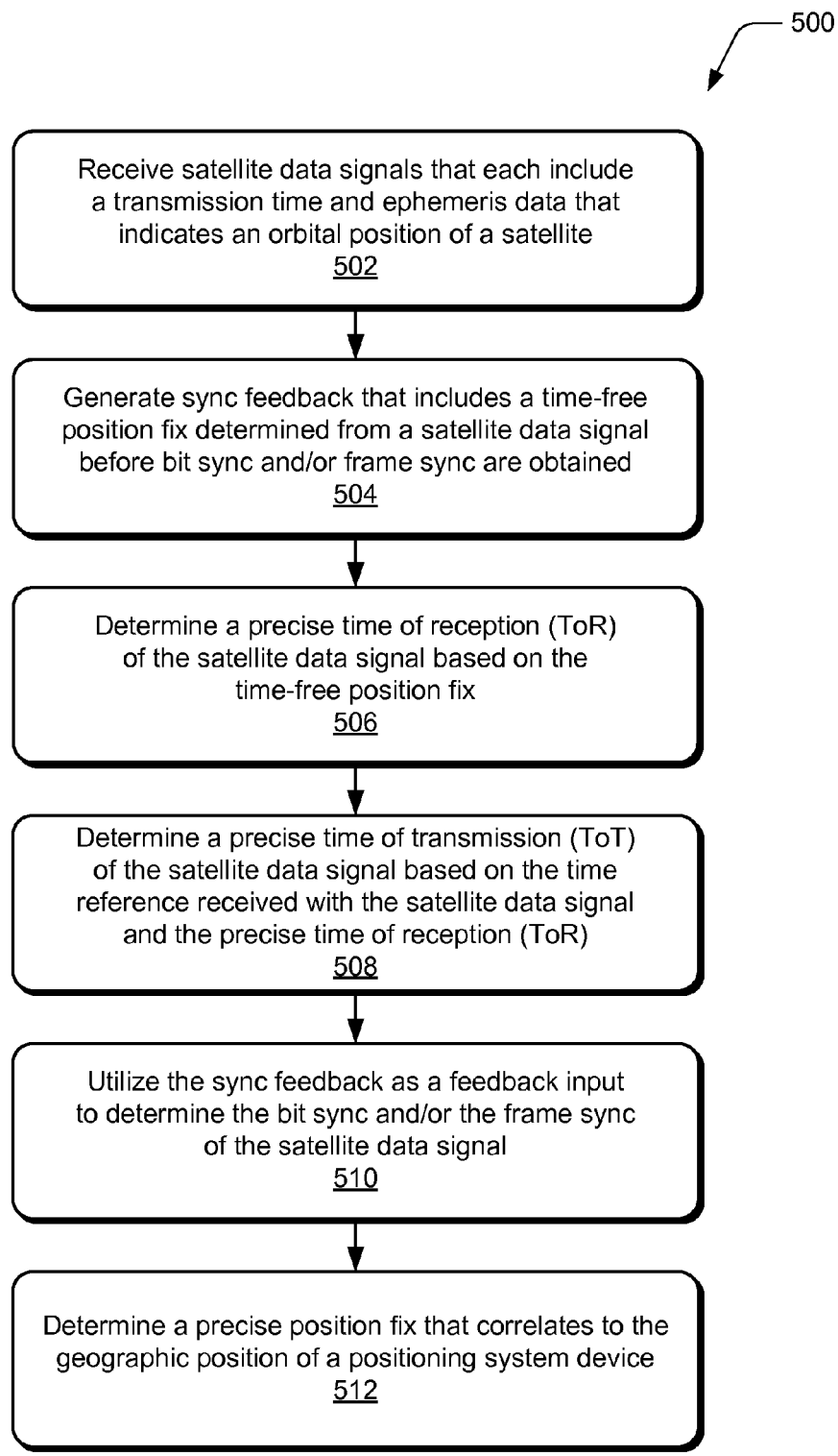
FIG. 5 illustrates example methods of sync feedback for TTFF in accordance with one or more embodiments.

FIG. 5 illustrates example method(s) 500 of sync feedback for TTFF. The order in which the method is described is not intended to be construed as a limitation, and any number of the described method blocks can be combined in any order to implement the method, or an alternate method.

At block 502, satellite data signals are received that each includes a time reference and ephemeris data that indicates an orbital position of a satellite. For example, the receiver 110 at the positioning-system device 102 (FIG. 1) receives the satellite data signals 112 from the satellites 114. Similarly, the positioning-system receiver 316 in the system-on-chip (SoC) 300 (FIG. 3) receives satellite data signals, such as from satellites in a global navigation satellite system (GNSS), to include the Global Positioning System (GPS). Each of the satellite data signals includes a time reference for transmission of a data signal, ephemeris data that indicates an orbital position of a satellite from which the data signal is transmitted, and the almanac information that includes approximate orbital and status information for all of the satellites in the system.

At block 504, a sync feedback is generated that includes a time-free position fix determined from a satellite data signal before bit sync and/or frame sync are obtained. At block 506, a precise time of reception (ToR) of the satellite data signal is determined based on the time-free position fix. At block 508, a precise time of transmission (ToT) of the satellite data signal is determined based on the time reference received with the satellite data signal and the precise time of reception (ToR). The sync feedback is generated to include the time-free position fix, the precise time of reception (ToR) of the satellite data signal, and the precise time of transmission (ToT) of the satellite data signal.

For example, the position solution service 108 implemented at the positioning-system device 102 generates the sync feedback 122 before bit sync 124 and/or frame sync 126 of a satellite data signal are obtained. The position solution service determines the time-free position fix 200 (FIG. 2), determines the precise time of reception (ToR) 202 of the satellite data signal based on the time-free position fix, and determines the precise time of transmission (ToT) 204 of the satellite data signal based on the time reference received with the satellite data signal and the precise time of reception (ToR). Similarly, the position solution service 318 in the SoC 300 generates sync feedback to include a time-free position fix that correlates to an approximate geographic position of the positioning-system receiver 316. The position solution service 318 also determines a precise time of reception (ToR) of a satellite data signal based on the time-free position fix, and determines the precise time of transmission (ToT) of the satellite data signal based on the precise time of reception (ToR) and a time reference received with the satellite data signal.

At block 510, the sync feedback is utilized as a feedback input to determine the bit sync and/or the frame sync of the satellite data signal. For example, the position solution service 108 at the positioning-system device 102 utilizes the sync feedback 122 to determine the frame sync 126 of the satellite data signal approximately simultaneously with the bit sync 124 of the satellite data signal. Similarly, the position solution service 318 in the SoC 300 utilizes the sync feedback to determine the frame sync of a satellite data signal approximately simultaneously with the bit sync of the satellite data signal.

At block 512, a precise position fix is determined that correlates to the geographic position of a positioning-system device. For example, the position solution service 108 at the positioning-system device 102 determines the precise position fix 132 that correlates to the geographic position of a positioning-system device. In embodiments, the time-free position fix 200 is determined once and not displayed as a position fix prior to the precise position fix 132 being displayed to indicate the geographic position of the positioning-system device. Similarly, the position solution service 318 in the SoC 300 determines the precise position fix that correlates to the geographic position of the positioning-system receiver 316 in the SoC. For example, the precise position fix determined by the position solution service 318 correlates to the geographic position of a positioning-system device that incorporates the SoC.

Figure 6:
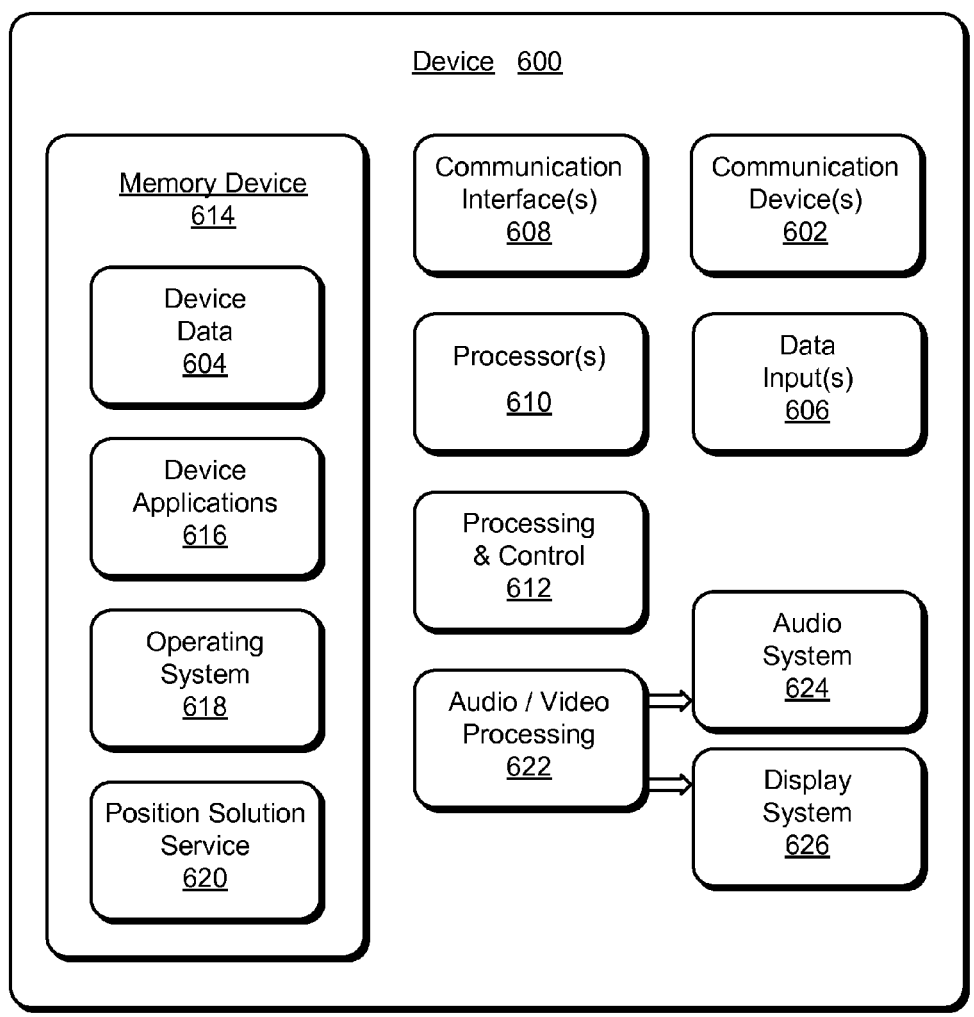
FIG. 6 illustrates various components of an example device that can implement embodiments of sync feedback for TTFF.

FIG. 6 illustrates various components of an example device 600 that can be implemented as any of the devices, or services implemented by devices, described with reference to the previous FIGS. 1-5. The device may also be implemented to include the example system-on-chip (SoC) described with reference to FIG. 3. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as received data, data that is being received, data scheduled for broadcast, data packets of the data, etc. The device data or other device content can include configuration settings of the device, media content stored on the device, and/or information associated with a user of the device.

Media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device.

The device 600 includes one or more processors 610 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 612. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

A memory device 614 provides data storage mechanisms to store the device data 604, other types of information and/or data, and various device applications 616. For example, an operating system 618 can be maintained as a software application with a memory device and executed by the processors. The device applications may also include a device manager, such as any form of a control application, software application, signal processing and control module, code that is native to a particular device, a hardware abstraction layer for a particular device, and so on. In this example, the device applications 616 include a position solution service 620, such as when device 600 is implemented as a positioning-system device. The position solution service is shown as software and/or a computer application. Alternatively or in addition, the position solution service can be implemented as hardware, software, firmware, fixed logic, or any combination thereof.

The device 600 also includes an audio and/or video processing system 622 that generates audio data for an audio system 624 and/or generates display data for a display system 626. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of sync feedback for time to first fix (TTFF) have been described in language specific to features and/or methods, the subject of the appended claims is not necessarily limited to the specific features or methods described. Rather the specific features and methods are disclosed as example implementations of sync feedback for TTFF.

What is claimed:

1. A positioning-system device, comprising:
  a positioning-system receiver configured to acquire and pull-in satellite data signals, each of the satellite data signals comprising at least a time reference;
  a processor coupled to the positioning-system receiver; and
  a memory device comprising instructions executable by the processor to implement a position solution service that is configured to:
    generate sync feedback, if the positioning-system device has not obtained a bit sync or a frame sync, which includes a time-free position fix, the time-free position fix determined from:
      a satellite data signal; and
      approximate receiver time, the approximate receiver time maintained locally by a real time clock in the positioning-system device,
    the generation of the sync feedback occurring after signal pull-in of the satellite data signal and before at least one of the bit sync or the frame sync is obtained by the positioning-system receiver; and
    utilize the sync feedback as a feedback input to determine at least one of the bit sync or the frame sync of the satellite data signal.

2. The positioning-system device of claim 1, wherein each of the satellite data signals further comprise ephemeris data, and the position solution service is further configured to:
  download the ephemeris data after generation of the frame sync.

3. The positioning-system device of claim 2, wherein the position solution service is further configured to:
  determine a precise position fix that correlates to a geographic position of the positioning-system device; and
  display the precise position fix.

4. The positioning-system device of claim 3, wherein Kalman filtering is applied to smooth the precise position fix.

5. The positioning-system device of claim 1, wherein the determination of the time-free position fix further comprises determining a common time error of four or more satellites.

6. The positioning-system device of claim 1, wherein the generation of sync feedback is performed using previously downloaded ephemeris data.

7. The positioning-system device of claim 1, wherein the position solution service is further configured to:
  track the satellite data signal after one of the bit sync or the frame sync is generated.

8. A method, comprising:
  receiving satellite data signals, at a positioning-system receiver of a positioning device, which each comprise at least a time reference;
  generating sync feedback, by the positioning device, before obtaining at least one of a bit sync or a frame sync by the positioning-system receiver, which includes a time-free position fix determined using:
    a satellite data signal; and approximate receiver time, the approximate receiver time being maintained locally by a real time clock in the positioning device; and utilizing the sync feedback as a feedback input to determine at least one of the bit sync or the frame sync of the satellite data signal.

9. The method of claim 8, wherein each of the satellite data signals further comprise ephemeris data, and the method further comprising:

responsive to generating the frame sync, downloading the ephemeris data.

10. The method of claim 9, further comprising:

determining a precise position fix that correlates to a geographic position of the positioning-system device; and displaying the precise position fix.

11. The method of claim 10, wherein Kalman filtering is applied to smooth the precise position fix.

12. The method of claim 8, wherein the determining of the time-free position fix further comprises determining a common time error of four or more satellites.

13. The method of claim 8, wherein the generating sync feedback is performed using previously downloaded ephemeris data.

14. The method of claim 8, further comprising:

tracking the satellite data signal after one of the bit sync or the frame sync is generated.

15. A system-on-chip, comprising:

a positioning-system receiver configured to receive satellite data signals, each of the satellite data signals comprising at least a time reference;

a processor coupled to the positioning-system receiver; and a memory device comprising instructions executable by the processor to implement a position solution service that is programmed to:

generate sync feedback, if one of a bit sync or a frame sync has not been obtained, which includes a time-free position fix determined using:

a satellite data signal; and approximate receiver time, the approximate receiver time being maintained locally by a real time clock in the positioning-system receiver, the generating frame sync occurring before at least one of the bit sync or the frame sync is obtained by the positioning-system receiver; and utilize the sync feedback as a feedback input to determine at least one of the bit sync or the frame sync of the satellite data signal.

16. The system-on-chip of claim 15, wherein each of the satellite data signals further comprise ephemeris data, and the position solution service is further programmed to:

download the ephemeris data after generation of the frame sync.

17. The system-on-chip of claim 16, wherein the position solution service is further programmed to:

determine a precise position fix that correlates to a geographic position of a positioning-system device; and display the precise position fix.

18. The system-on-chip of claim 17, wherein Kalman filtering is applied to smooth the precise position fix.

19. The system-on-chip of claim 15, wherein the determination of the time-free position fix further comprises determining a common time error of four or more satellites.

20. A system-on-chip of claim 15, wherein the position solution service is further programmed to:

track the satellite data signal after one of the bit sync or the frame sync is generated.

* * * * *